Oct. 21, 1958
R. L. HARTER
2,857,491
PRESSURE RESPONSIVE SWITCH ACTUATOR
Filed Feb. 8, 1955
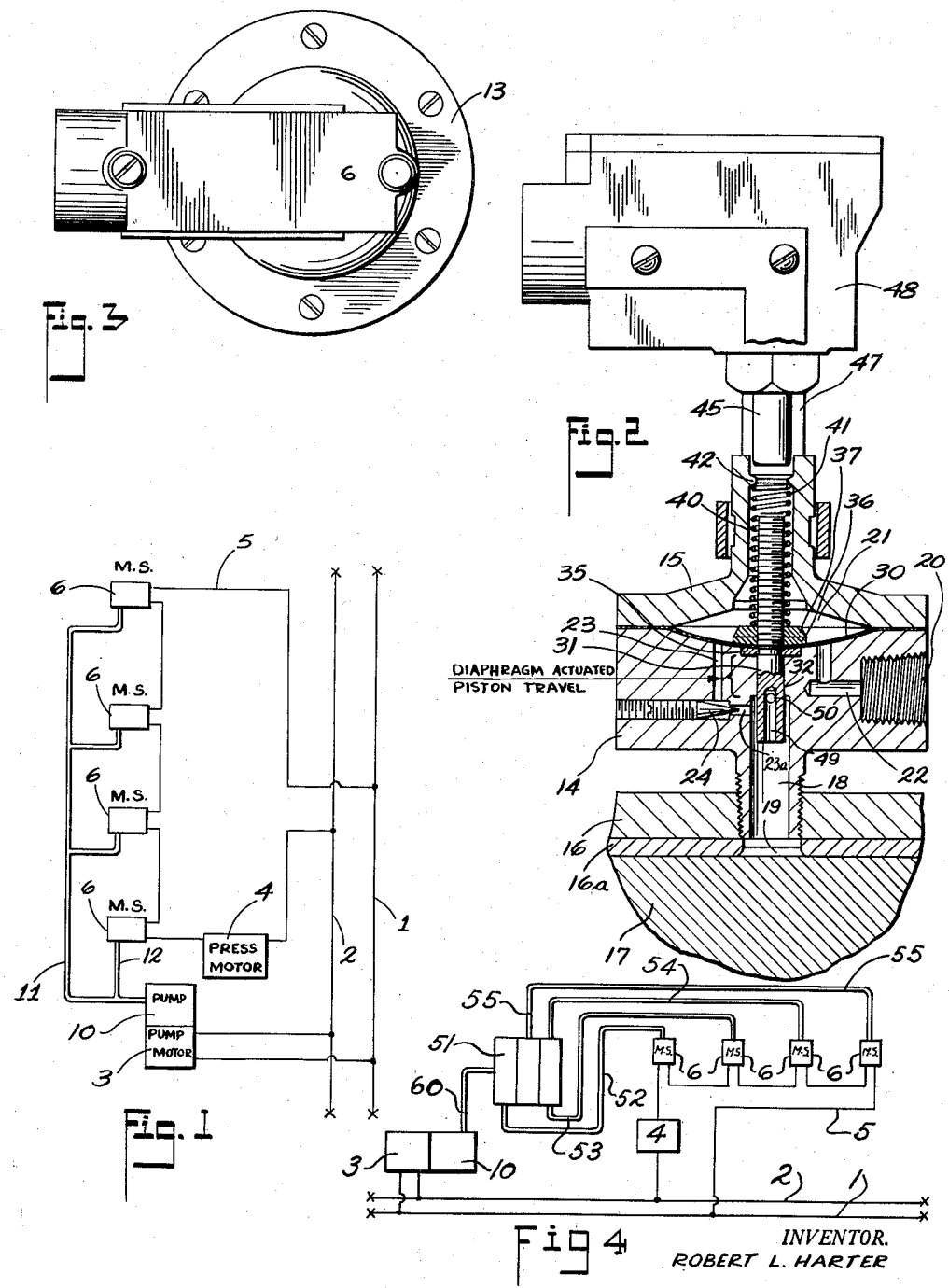
INVENTOR.
ROBERT L. HARTER
BY
RICHEY, WATTS, EDGERTON & McNENNY
B. D. Watts
ATTORNEYS

United States Patent Office 2,857,491
Patented Oct. 21, 1958

2,857,491
PRESSURE RESPONSIVE SWITCH ACTUATOR

Robert L. Harter, Shaker Heights, Ohio, assignor to Trabon Engineering Corporation, Cleveland, Ohio, a corporation of Ohio Application February 8, 1955, Serial No. 486,808

2 Claims. (Cl. 200—83)

This invention relates to the art of controlling driving apparatus for machinery and is particularly concerned with means actuated by the flow of lubricant to a bearing of a machine for controlling actuation of the driving mechanism of the machine.

In present-day machines which embody a plurality of machine elements which are moved at high speeds or which bear heavy pressures, it is essential to continued operation that the bearings be not only adequately lubricated while in use but properly lubricated before the machine begins to operate, i. e., before its drive mechanism is actuated. An illustration of a machine which has such requirements is a high speed punch press. In such a machine the bearings are subjected to heavy pressures applied at short intervals throughout the entire working day. Such a machine may be put out of commission and even seriously damaged if it begins to operate, or operates, without an adequate supply of lubricant at each and every bearing. Accordingly, it is important to provide a positive means of insuring an initially adequate supply of lubricant before the machine begins to operate and a continuous supply during its entire operation but, so far as I know, no apparatus satisfactory for this purpose has been provided heretofore.

The present invention aims to supply such means and accomplishes this aim by employing the pressure of the lubricant going to each of the bearings as to control the actuation of the machine driving means.

The present invention will be better understood by those skilled in the art from the following specification and the drawings which accompany and form a part thereof and in which:

Fig. 1 is a diagram showing apparatus embodying the present invention;

Fig. 2 is a side elevational view, partly in section, of one of the lubricant controlled microswitches shown in Fig. 1;

Fig. 3 is a top plan view of the apparatus of Fig. 2; and

Fig. 4 is a view similar to that of Fig. 1 but showing different apparatus embodying this invention.

In Fig. 1, power line conductors 1 and 2 are shown connected directly to a pump motor 3 and to a press motor 4 through a circuit 5 which includes a microswitch unit 6 for each of the bearings of a press (not shown), the moving parts of which are actuated by the motor 4. It will be understood that the number of microswitches shown in Fig. 1 is merely illustrative and that many more bearings will usually be present in a machine to which the present invention is applied. When all the microswitches 6 are closed, current will flow from main line conductors 1 and 2 through circuit 5 and motor 4 and the latter will be energized and will actuate the driving mechanism of the press or other machine to which it is connected.

When the pump motor 3 is actuated, it will actuate pump 10 which is connected to a source of lubricant (not shown) and which will apply pressure to the lubricant, thereby forcing lubricant out through main conduit 11 and branch conduits 12 leading therefrom through a microswitch actuating device 13 and thence to a bearing to be lubricated.

The microswitch controlling device 13 is shown in some detail in Fig. 2. This device 13 comprises a body 14 and a cover 15. The body 14 is threaded into a backing 16 of a bearing 16a engaging machine element 17 and has a lubricant passage 18 communicating with a lubricant groove 19 in the bearing. One of the branch conduits 12 is connected to the body in opening 20 and communicates through a passage 22 with a diaphragm chamber 21 which is formed between opposed surfaces of body 14 and cover 15. The body has passages 23 and 23a leading from the diaphragm chamber 21 past an adjustable needle valve 24 and into passage 18.

A diaphragm 30 is clamped at its periphery between body 14 and cover 15 and is provided with a stem 31 which has a threaded outer end and a smooth cylindrical surface at its inner end having a close sliding fit in passage 32 which is of substantial length and extends from the diaphragm chamber 21 into the adjacent end of passage 18. This stem 31 is clamped against diaphragm 30 by a washer 35 seated on a shoulder of the stem below the diaphragm and bearing against the latter and a washer 36 pressed against the other side of the diaphragm by a nut 37 which engages the threads of the stem. The cover 15 is provided with an axial opening 40 into which the threaded end of stem 31 extends within a spring 41 which bears against the nut 37 and against a shoulder 42 at the upper end of passage 40. The movable switch-closing plunger 45 of microswitch 6 is mounted for endwise movement in a housing 47 which is connected to the microswitch housing 48 and to cover 15 adjacent to the shoulder 42. The distance between the opposed ends of the threaded part of stem 31 and plunger 45 is such that when the diaphragm 30 has been moved from the position shown in Fig. 2 to a position with the diaphragm substantially engaging the opposed surface of cover 15, the outer end of stem 31 will engage the opposed end of plunger 45 and move the latter endwise with resultant closing of the switch. The inner end of stem 31 has an axial recess 49 and a radial aperture 50, the latter communicating with chamber 21 when diaphragm 30 is in its outer, switch-closing position. When all the switches 6 in circuit 5 have thus been closed, the motor 4 will be energized and, in turn, will actuate the driving mechanism of the machine and actuate machine element 17 in bearing 16a.

It will be understood that when lubricant under pressure is supplied to the apparatus shown in Fig. 2, it will flow into the diaphragm chamber 21 through passage 22 and will move the diaphragm outwardly. As the diaphragm is thus moved to a predetermined extent, aperture 50, which was closed by the walls defining passage 32 during much of the travel of the stem 31, is opened and the lubricant will flow through it and into and through recess 49 and into bearing groove 19. When all these spaces are filled and back pressure is built up therein, the diaphragm will be moved to its outermost position in contact with cover 15 with coincident movement of stem 31 into contact with plunger 45 and movement of the latter into switch-closing position.

When this pressure is decreased, as by stoppage of pump motor 3, failure by pump 10 to supply lubricant under the necessary pressure to line 11, or breakage or leakage of lines 11 or 12, spring 41 will move stem 31 away from plunger 45 thereby causing switch 6 to open and motor 4 to be de-energized, thus stopping the machine. The lubricant on the inner side of diaphragm 30 may escape through aperture 50 and recess 49 until the stem 31 has moved far enough to close aperture 50 by bringing it within the wall defining the restricted passage 32 and at the same time lubricant may escape through passages 23 and 23a at a rate controlled by needle valve 24. Since the lubricant holding capacity of chamber 21 on the inner side of diaphragm 30 is small, only a short time is required for the lubricant to escape past valve 24.

Thus it will be seen that when a machine is to be started in operation, switches (not shown) may be closed in the circuits to the machine driven motor 4 and to the pump motor 3 but that the machine drive motor will not be energized because the microswitches will initially be opened. The pump motor will propel lubricant through the main line 11 and branch lines 12 into each of the several microswitch controlling devices where the several stems 32 will be moved endwise to admit lubricant to a bearing 17 in communication therewith and, when the pressure in each diaphragm chamber builds up due to the accumulation of lubricant in the bearing to such an extent that the diaphragm 21 is moved to the far end of its stroke and the microswitch is closed, the circuit to the motor 4 will be closed whereupon the machine will be driven. This condition will exist until the machine is shut down, or the pump ceases to function or one of the conduits 11 or 12 breaks or allows lubricant pressure to leak therefrom in amounts sufficient to permit one of the diaphragms to move endwise away from the plunger 45 and permit its microswitch to open. Thus it is evident that the above described apparatus will prevent operation of the drive means of a machine unless and until each bearing has been supplied with, and while it continues to be supplied with, an adequate amount of lubricant.

Fig. 4 shows the present invention embodied in a different type of lubricating system. In this figure the power lines 1, 2 and 5, the motors 3 and 4, switches 6, switch controls 13 and pump 10 are like the same numbered parts of Fig. 1. Conduit 60 leading from the pump opens into a feeder 51 which may be like that shown in my copending application Serial No. 196,921, filed November 21, 1950, now abandoned.

Lubricant is delivered from the feeder to the bearings through separate lines 52, 53, 54 and 55.

The controls 13 operate in the same manner with the apparatus of Fig. 4 as with that of Fig. 1.

Having thus described the present invention so that others skilled in the art may be able to understand and practice the same, I state that what I desire to secure by Letters Patent is defined in what is claimed.

What is claimed is:

1. Apparatus for controlling electrically driven means having a bearing to be lubricated comprising a body having a chamber, a flexible diaphragm in said chamber and capable of being flexed by pressure of lubricant on one side thereof, said body having an inlet passage opening into said chamber on said one side of the diaphragm for conducting lubricant under diaphragm flexing pressure thereinto and having outlet passages leading out of the chamber from said side of the diaphragm to conduct lubricant therefrom to said bearing, the first of said outlet passages having a restricted portion of substantial length adjacent to said chamber and an enlarged portion remote from said chamber, the second of said outlet passages opening into the enlarged portion of the first said outlet passage, a stem secured to said diaphragm, the part of the stem on the lubricant side of the diaphragm having fluid sealing, sliding engagement with the wall defining the restricted portion of said first outlet passage and having a passage therethrough which is closed by the wall of said restricted portion during much of the travel of said stem but which is opened to permit lubricant to flow from said chamber when the diaphragm has been flexed to a predetermined extent, the part of the stem on the other side of the diaphragm being secured thereto and engageable with a micro-switch actuating means to actuate the latter and thereby control the flow of electric current to said driven means when lubricant under pressure in said chamber flexes the diaphragm in one direction to a predetermined extent, and means pressing against the diaphragm to flex the latter in the opposite direction when the lubricant pressure in said chamber decreases.

2. The combination of elements set forth in claim 1 in which the second of said outlet passages is provided with a needle valve to control the flow of lubricant therethrough.

References Cited in the file of this patent
UNITED STATES PATENTS

| | | |
|---|---|---|
| 723,211 | Ivor | Mar. 17, 1903 |
| 1,387,746 | Webb | Aug. 16, 1921 |
| 1,938,327 | Green | Dec. 5, 1933 |
| 2,502,318 | Fischer | Mar. 28, 1950 |
| 2,522,697 | Welch | Sept. 19, 1950 |
| 2,558,830 | Drane | July 3, 1951 |
| 2,611,045 | Wayman | Sept. 16, 1952 |
| 2,688,382 | Georgeff | Sept. 7, 1954 |

FOREIGN PATENTS

| | | |
|---|---|---|
| 763,106 | France | Feb. 5, 1934 |
| 238,890 | Switzerland | Dec. 3, 1945 |